INVENTOR
Raymond Annino
Peter F. McCrea

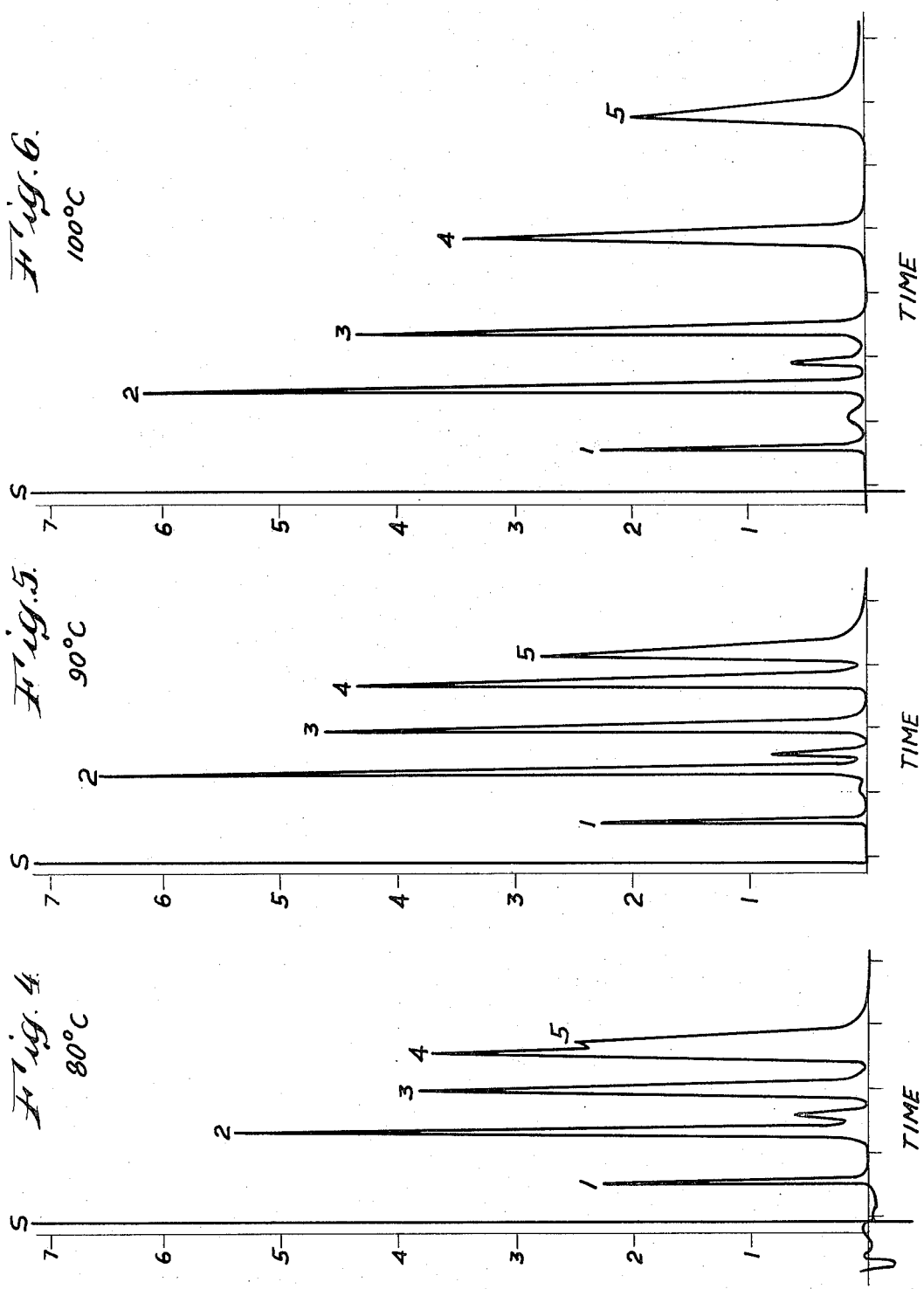

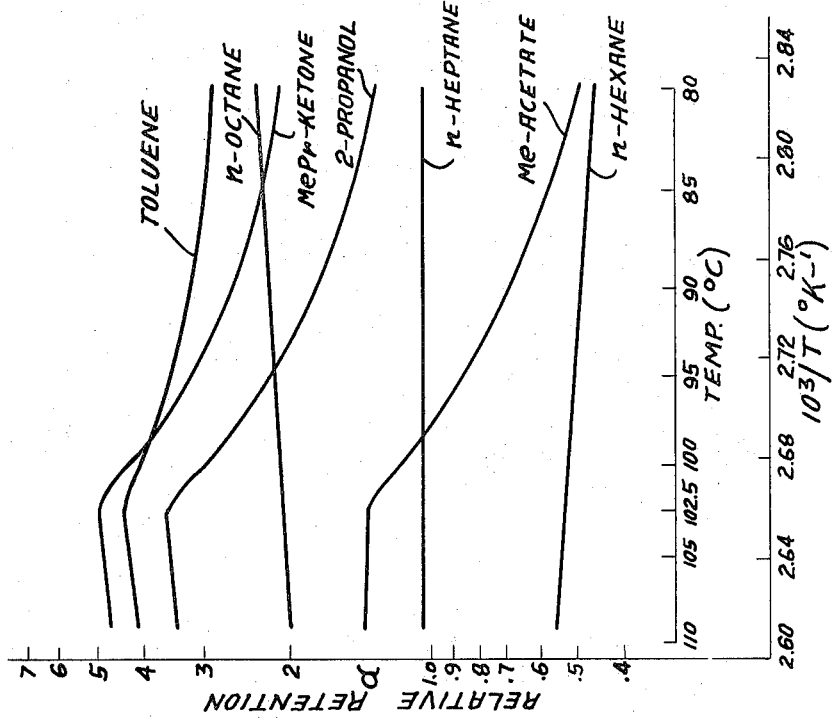
Fig. 8. TEMPERATURE DEPENDENCE OF RELATIVE RETENTION IN A 10 MOLE % STEARIC-NONANEDIOIC ACID COLUMN
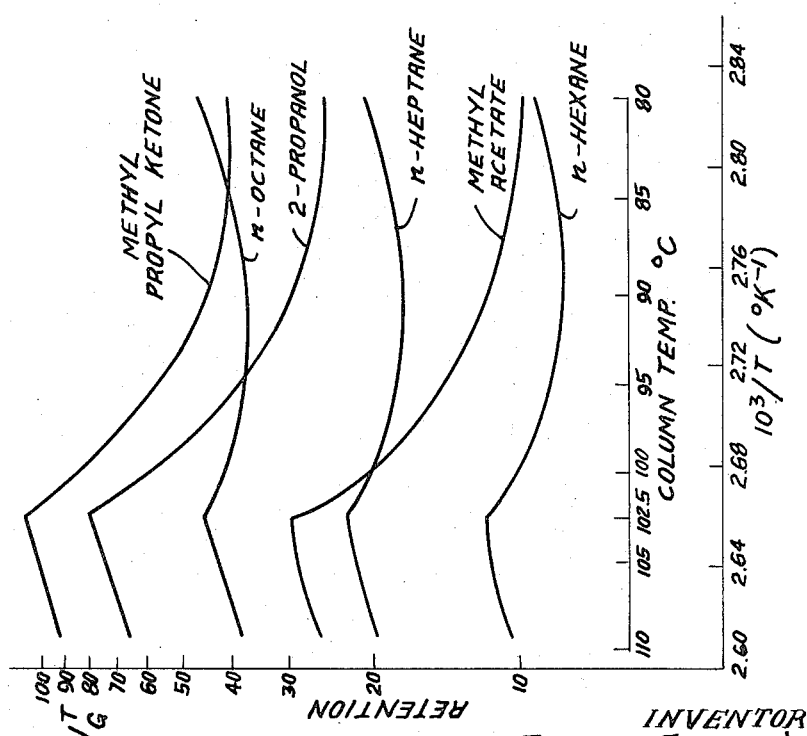
Fig. 7. SOLUTE RETENTION VS RECIPROCAL TEMPERATURE IN A 10 MOLE % STEARIC-NONANEDIOIC ACID COLUMN

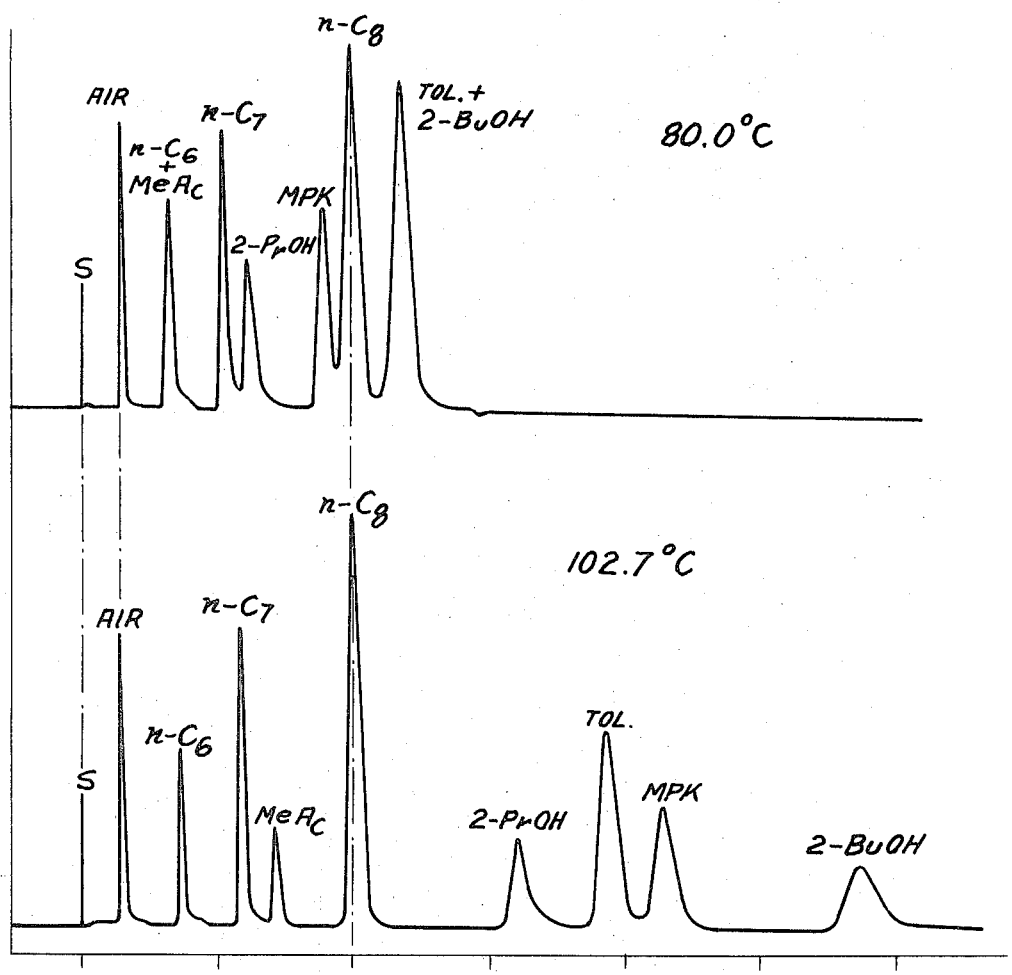

3,822,203
CHROMATOGRAPHIC TECHNIQUES PROVIDING VARIABLE-SELECTIVITY STATIONARY PHASE
Raymond Annino, Plainville, Mass., and Peter F. McCrea, Cranston, R.I., assignors to The Foxboro Company, Foxboro, Mass.
Continuation of abandoned application Ser. No. 15,131, Feb. 27, 1970. This application Oct. 10, 1972, Ser. No. 295,863
Int. Cl. B01d 15/08
U.S. Cl. 210—31 C
10 Claims

ABSTRACT OF THE DISCLOSURE

Techniques for obtaining substantial changes in the specificity of a chromatographic separation column by changing the temperature of the sorbent material. In a disclosed illustration, the sorbent comprises a solid solution of two substances having a relatively broad thaw-melt region, the substances further being selected to possess different degrees of selectivity toward various classes of solutes. The technique can be used to obtain optimized separation of components, and to provide a basis for permitting identification of components.

---

This is a continuation of application Ser. No. 15,131 filed Feb. 27, 1970, now abandoned.

This invention relates to chromatographic techniques for separating components of a sample mixture. More particularly, this invention relates to methods and apparatus providing expanded flexibility and versatility in the use of chromatographic equipment.

Chromatographic apparatus of various kinds has been used for many years to effect separation of the components of a sample mixture, primarily to permit measurements to be made of the concentrations of the separated components, and in some cases to aid in identifying components. Typically, such equipment includes a column in the form of a hollow tube within which is supported a sorbent material, i.e. a material which adsorbs the sample, or in which the sample may be dissolved. The sample mixture is carried through the column by an inert gas such as helium. The sorbent retains the sample components by differing time periods so that they emerge from the column at different times, thereby separated for individual analysis.

The degree of separation achieved is a function of many factors, including the nature of the sorbent material used. A given sorbent may be suitable for separating a certain pair or group of components, but unsatisfactory for separating other component groupings. This poses a problem where it is required that various different sample mixtures be analyzed, or where a particular sample mixture contains different types of components not readily separable by a single sorbent. Thus, there is a desire for improved chromatographic techniques providing greater flexibility than presently available. It particularly is desired to provide chromatographic apparatus having an expanded capability of separating sample components of different types.

Figure 1:
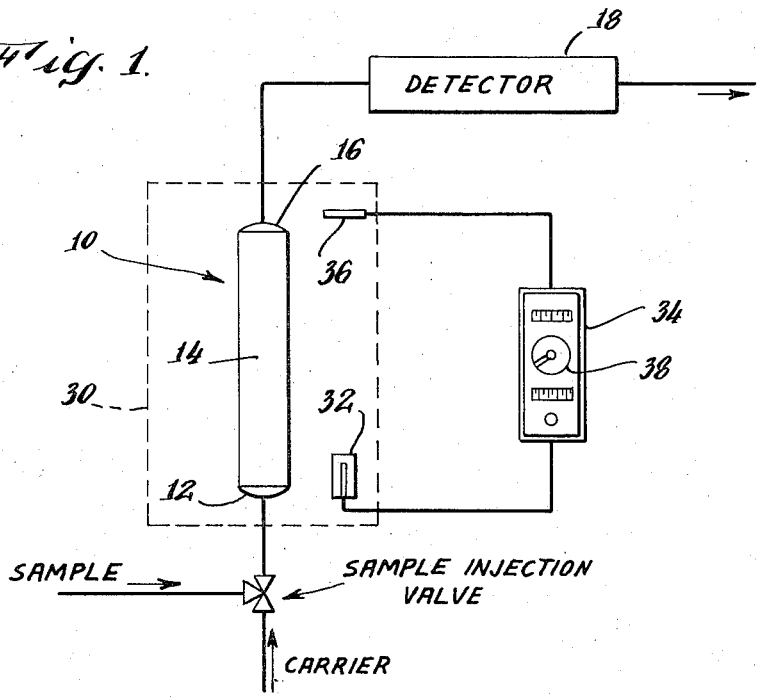
Figure 2:
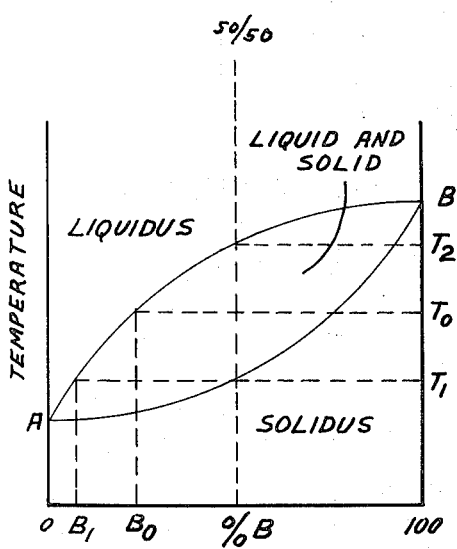
Figure 3:
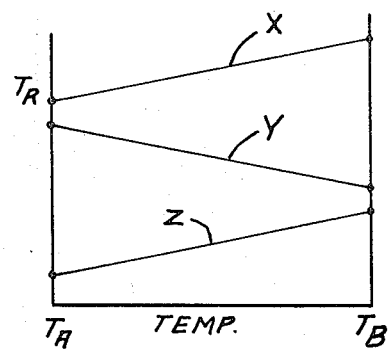

Accordingly, it is a principal object of this invention to provide chromatographic techniques affording enhanced flexibility. Another object of this invention is to provide chromatographic apparatus capable of operation with a wider range of sample mixtures than heretofore. Another object of the invention is to provide apparatus which can readily be altered, by adjusting a single parameter, to provide distinctly different separation characteristics. Other objects, aspects and advantages of the invention will in part be pointed out in, and in part apparent from, the following description considered together with the accompanying drawings, in which:

FIG. 1 illustrates in diagrammatic form a chromatographic column with associated equipment;
FIG. 2 shows (in idealized form) a phase equilibrium diagram for a solid solution;
FIG. 3 illustrates (in idealized form) the variation with temperature of the retention times for different components of a sample adsorbed by a solid solution solvent in accordance with this invention; and
FIGS. 4 through 9 are graphs which present pertinent data concerning the invention.

Referring now to FIG. 1, there is shown the basic elements of a chromatographic analyzer which includes a column 10 adapted to receive at the input end 12 a sample fluid of components to be separated. Typically, the sample will consist of a carefully metered quantity of gas, carried into and through the column by a non-reactive carrier gas. The column contains a stationary sorbent 14 which generally is a non-volatile liquid substance coated on the column walls, or supported by small solid particles held fixed or packed in the column.

The sorbent (solvent) in the column is selected to provide different "partition coefficients" for the different components (solutes) to be separated. Thus, the components are adsorbed or dissolved to different degrees, so that the effective velocities of the components in passing through the column will differ. Consequently, the components will emerge, or "elute," at different times from the output end 16 of the column, and thereby are separated for individual analysis.

The concentrations of the separated components are measured by a sensor 18 which may, for example, be a thermal conductivity detector adapted to produce an output signal consisting of a series of consecutive peaks each indicating the concentration of a corresponding component. These sequential signals from the detector conventionally are directed to a recording instrument (not shown herein) which serves in conventional fashion to develop a "chromatogram" consisting of a series of vertical peaks spread out along a horizontal time base. The height of each peak, or in some cases the area under each peak, is measured to obtain a quantitative determination of the concentration of the corresponding component.

To assure accurate measurement results, it is essential to have adequate separation of the components of interest. If separation is inadequate, adjacent peaks will blend or run together, so that the measured value does not represent a single component. Such overlapping can distort seriously either the area or the peak height measurements.

The amount of separation, or "resolution," depends upon several factors, including the column length, sorbent material, and the sorbent temperature. Resolution can be increased somewhat by reducing the sorbent temperature, but this effect is relatively minor, and in any event is of no benefit after the freezing point of a liquid sorbent is reached. Lengthening the column will increase the resolution, but of course it is not always practical to obtain the required resolution in this manner. For example, increasing the column length will also increase proportionately the time required for the sample to pass through the column.

Because of these factors, different groupings or sets of components have commonly required quite different sorbents to effect proper separation for analysis. Although this need not cause any serious difficulty in applications where the analysis always is of a particular component set for which there is a suitable sorbent, it does present difficulties where a variety of different component sets must be analyzed. Changing the column packing for each new set of components is an unsatisfactory procedure, and providing a separate column for each different set can be excessively costly. Thus, there is need for a new approach which can permit the analysis in a single apparatus of quite different sets of components, without any major alteration to the equipment. More particularly, what is needed is a means for controlling solvent specificity without actually changing the column.

The ability readily to control column specificity provides important additional benefits. Valuable analytic information can be derived by analyzing a given mixture with two (or more) different sorbent characteristics. Such multiple analyses can provide data from which individual components may be identified. Thus the versatility of the chromatograph is expanded from solely measuring concentrations of known components, into other areas of utility, if column specificity can be controlled in a convenient manner.

It has been found that such results can be achieved to a significant degree in accordance with the present invention by using as the sorbent a mixture of two dissimilar substances having significantly different degrees of attraction to at least one of the components to be separated, and providing means to controllably set the relative proportions of these two substances by controlling a physical condition of the mixture. In a preferred embodiment of the invention, the sorbent mixture is a composition of the type sometimes referred to as a solid solution. By selectively setting the temperature of the mixture, the chromatographic equipment provides correspondingly controlled separation characteristics. For example, the temperature can be set at a level whereby the separation characteristics are optimized for a particular set of components to be resolved.

Referring now to FIG. 2, there is shown a simplified phase equilibrium diagram of a solid solution of two substances A and B, such as might be used as sorbents in a chromatographic column. These substances have quite different melting points, and provide an extended melting range within which the relative proportions, in the liquid phase, vary markedly with temperature. As a specific example, assume an original solid mixture of say, half A and half B, as represented by the vertical dotted line 30. It will be seen that increasing the temperature of the solid to $T_1$ will cause the material to start to melt and initially produce a liquid which is nearly pure A, i.e. with a small proportion of B as indicated at $B_1$. Further increases in temperature will increase the proportion of B in the liquid phase, until at temperature $T_2$ all of the material will be liquid, with the original proportion of 50% A and 50% B.

It should particularly be noted that within the transition range between $T_1$ and $T_2$, the relative proportions of A and B in the liquid phase can be controlled by setting the temperature of the sorbent in the column. For example, at the intermediate temperature of $T_0$, the liquid phase will contain the percentage of B indicated at $B_0$.

In accordance with a principal aspect of the present invention, this variable proportioning of two substances is used to control the specificity of the column sorbent. More particularly, by using as the sorbent a solid solution including two substances which have quite different melting temperatures so as to exhibit an extended transition range of melting (thus referred to herein as a "transition sorbent"), and by selecting the two substances to have significantly dissimilar degrees of affinity or attractiveness to the particular solutes to be analyzed, an effective influence over the amount of separation of the two solutes can be achieved by selectively setting the temperature within the transition range.

This characteristic can be illustrated by the idealized graph of FIG. 3 showing the influence of temperature on the retention time $T_R$ of three different solutes X, Y and Z, passing through a column having a transition sorbent in accordance with the present invention. (Note: Retention time is a measure of the time a given solute is delayed by the sorbent.) The difference in retention times for any pair of solutes, at any given temperature, indicates the degree of separation for those solutes as they elute from the column. FIG. 3 shows that at temperature $T_A$ there would be a considerable separation between components X and Y but only a small separation between Y and Z. At temperature $T_B$ these relationships are reversed, with a large separation between Y and Z but only a small separation between X and Y.

Thus, it will be apparent that if one were to use the column represented by FIG. 3 to separate only X and Y, the temperatures would properly be set at $T_A$. If, thereafter, a sample mixture were to be analyzed requiring the separation of only Y and Z, the temperature is readjusted to $T_B$, before introducing the sample into the column, in order to achieve optimum separation. If it is desired to analyze all three components in a single sample, the temperature would be adjusted to an intermediate value, such as $T_0$, to provide an effectively optimum degree of separation between all three components. Thus, the temperature selected to produce optimum results depends upon how many components must be separated during a single sample run.

One important characteristic of a sorbent in accordance with this invention is that the slopes of the "retention time vs. temperature" curves (FIG. 3) for two solutes of interest will be significantly different. In some cases, the slopes will have a different sign, i.e. one curve sloping up, the other down; the curves may in certain instances actually cross over one another within the transition range. With such differential slope characteristics, varying the temperature of the sorbent will have a considerable effect on the degree of separation of the components as they elute from the column, and make possible the selection of a temperature providing optimum separation.

FIG. 1 includes an illustration of means for controlling the temperature of a transition sorbent. In this arrangement, the column 10 is placed in an oven represented by the dotted enclosure 30. This oven includes a heater element 32 the power to which is set by a conventional controller 34 in response to the measurement signal from a temperature sensor 36. The controller includes the usual set point knob 38, where the desired temperature is set in prior to introduction of the sample mixture into the column. The controller automatically maintains the temperature at the set point.

Advantageously, the two substances forming the transition sorbent have at least a moderately different polarity. It would appear that good results are achieved by substances both of which have at least some polar characteristics. As the relative proportions of the two combined substances change through the temperature transition range, there will be a corresponding change in effect on the affinity of the solutes for the composite liquid sorbent.

FIGS. 4 through 6 are chromatograms showing the effect of changes in temperature of one sorbent in accordance with this invention. The sorbent was formed of 10 mole percent stearic acid in nonanedioic acid (22.2% w./w. on 80–100 mesh GC–22, 0.9035 grams solvent). Stearic acid is relatively non-polar, with a melting point about 70° C., while nonanedioic acid is relatively polar, and has a melting point about 106° C. The column had a length of 7.498 feet, and O.D. of ⅛″, and a Helium carrier flow rate of 21 milliliters/minute. The sample in each case was 100 microliters of dilute vapor, and the peaks in the chromatograms are (1) air, (2) n-hexane, (3) cyclo-hexane, (4) benzene, and (5) 2-propanol. It should be noted that 2-propanol is relatively polar, benzene is less so, and the other solutes are relatively non-polar.

FIGS. 4, 5 and 6 respectively represent the results at column temperatures of 80° C., 90° C., and 100° C. At the lower temperature, the sorbent comprises a high concentration of the relatively non-polar stearic acid, and inadequate separation is achieved between benzene and 2-propanol. At 90°, more of the polar nonanedioic acid has liquified, and its presence is evidenced by an increase in separation of benzene and 2-propanol. It is reasoned that this is because the 2-propanol has a greater affinity for the more polar sorbent of the two solvent elements than does benzene. At 100°, this trend is carried still further, with the polar nonanedioic acid present in nearly its full strength. It may be noted particularly that the nonpolar solutes are hardly affected by the change in column temperature, while the remaining solutes are markedly affected.

FIG. 7 illustrates the temperature dependence of the degree of retention of a set of solutes by the same sorbent used in developing the chromatograms of FIGS. 4 through 6. (The retention data plotted is the so-called "specific retention volume," represented by the product of retention time and compressibility-corrected carrier flow rate, divided by the amount of solvent, thereby to generalize the results for different columns.) It may particularly be noted that there is one type of response for the normal alkanes, but a more active behavior for the more polar solutes comprising acetate, alcohol and ketone.

FIG. 8 shows the retention data of FIG. 7 normalized to that of n-heptane, to provide a plot of relative retention (alpha) versus reciprocal temperature. This graph shows the normal linear convergence of the alkane relative retentions with increasing temperature that occurs on conventional stationary phases. The magnitude of the shift in alpha is about 13% over the 80° C. to 102.7° C. transition region. The more polar solutes, however, exhibit a very significant shift in alpha over the same temperature span, amounting to increases of 175% for methyl acetate and 2-propanol, 136% for methyl propyl ketone, and 51% for toluene. It would appear from pertinent tests that the primary retention mechanism is one of partitioning.

The technique disclosed herein can provide a basis for the identification of solutes. Thus, by making measurements of absolute retention volumes at different temperatures (as in FIG. 7), computing relative retention volumes from such measurements, and analyzing the composite sets of data, specific components can be distinguished by their characteristics responses to changes in sorbent selectivity.

FIG. 9 illustrates the appearance of two actual chromatograms for the components represented in FIG. 8, obtained at temperatures corresponding to the two extremes of stationary phase polarity for the 10 mole percent stearic in nonanedioic acid column. The octane peak has an identical two-minute total retention time at both temperatures, whereas the retention times of the more polar solutes are shifted substantially. Column temperatures between the limits shown in FIG. 9 yield intermediate values of solute selectivity. Thus it is possible to obtain any desired amount of specificity for a given solute by controlling the temperature to an intermediate value.

Although many specific aspects of particular applications of the present invention have been described herein in detail, it is desired to stress that such details have been set forth primarily as explanatory of the inventive techniques, rather than as limitative thereof, for the purpose of enabling others better to understand the nature of the technology and thereby to permit the utilization of such techniques in various ways to meet the individual requirements of different applications.

What is claimed is:

1. The method of performing an analysis with respect to a component contained in first and second fluid samples, which method comprises:

flowing the first sample through a stationary mass of sorbent material which includes a mixture of two substances the relative proportions of which are maintained, during the passage of the sample, at a first preselected value by controlling a physical condition of said mixture to a first level, and wherein one of said substances has an affinity for said component which is significantly different from the affinity which the other substance has for said component such that the relative proportions of said two substances serves to control the retention time of said component in passing through said stationary material;

performing measurements on said component of said first sample after it has passed through said stationary material;

changing the retention time of said component by altering said physical condition of said mixture to a second level to change the relative proportions of said two substances to a second preselected value;

flowing said second sample through said stationary mass of material with said physical condition thereof at said second level; and performing measurements on said component in said second sample after it has passed through said stationary material.

2. The method of Claim 1, wherein the controlled physical condition is the temperature of the sorbent.

3. The method of Claim 2, wherein the two substances have widely different melting temperatures and define a solid solution.

4. The method of Claim 3, wherein the solid solution comprises two substances providing "retention time-versus-temperature" characteristics which have different rates-of-change for different components of interest in both of the samples.

5. The method of Claim 1, wherein said first and second samples are identical.

6. The method of chromatographically separating a first set of components of a first sample fluid and thereafter separating a second set of components of a second sample fluid, comprising:

flowing both sample fluids sequentially through stationary material presenting a mixture of two substances the relative proportions of which are variable in response to changes in a physical condition of the mixture, the affinity of one of said substances for one component of said first set being significantly different from the affinity of that substance for the other component of said first set, and the affinity of one of said substances for one component of said second set being significantly different from the affinity of that substance for the other component of said second set, the relative proportions of said two substances controlling the relative retention times of the respective components of both said first and second sets in passing through said stationary material;

the method further comprising the steps of setting said condition of said stationary material at a first level, prior to passing the first sample through said material, to fix the relative proportions of said two substances at a first value providing desired relative retention characteristics for the two components of said first set; and thereafter setting said condition of said stationary material at a second level, prior to passing the second sample through said material to fix the relative proportions of said two substances at a second value providing desired relative retention characteristics for the two components of said second set.

7. The method of Claim 6, wherein said physical condition of said mixture is the temperature thereof.

8. The method of Claim 7, wherein the two substances of said mixture have different melting points and together form a solid solution in the temperature range within which said temperature is varied.

9. The method of Claim 6, wherein said two substances of said mixture have at least a moderate difference in their polar characteristics.

10. The method of Claim 6, wherein said mixture of two substances provides "retention time-versus-condition" characteristics having different rates-of-change for said two components of interest within the controlled condition range.

References Cited

UNITED STATES PATENTS

| | | | |
|---|---|---|---|
| 3,048,029 | 8/1962 | Juvet et al. | 55—67 X |
| 3,305,000 | 2/1967 | Bullen et al. | 55—386 X |
| 3,628,310 | 12/1971 | Purnell | 55—67 |

JOHN ADEE, Primary Examiner

U.S. Cl. X.R.

55—67